(12) United States Patent
Tomizawa

(10) Patent No.: US 11,321,440 B2
(45) Date of Patent: May 3, 2022

(54) HEAD-MOUNTED DISPLAY APPARATUS, AUTHENTICATION SYSTEM, AND METHOD FOR CONTROLLING HEAD-MOUNTED DISPLAY APPARATUS

(71) Applicant: SEIKO EPSON CORPORATION, Tokyo (JP)

(72) Inventor: Takashi Tomizawa, Chiisagata-gun Aoki-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 526 days.

(21) Appl. No.: 16/282,746

(22) Filed: Feb. 22, 2019

(65) Prior Publication Data

US 2019/0266318 A1 Aug. 29, 2019

(30) Foreign Application Priority Data

Feb. 23, 2018 (JP) .............................. JP2018-030858

(51) Int. Cl.
   *G06F 21/36* (2013.01)
   *G02B 27/01* (2006.01)
   *G06V 40/10* (2022.01)

(52) U.S. Cl.
   CPC ........... *G06F 21/36* (2013.01); *G02B 27/017* (2013.01); *G02B 27/0172* (2013.01); *G06V 40/107* (2022.01); *G02B 2027/014* (2013.01); *G02B 2027/0138* (2013.01)

(58) Field of Classification Search
   None
   See application file for complete search history.

(56) References Cited

U.S. PATENT DOCUMENTS

| | | | |
|---|---|---|---|
| 9,317,126 B2 | 4/2016 | Fujimaki | |
| 2014/0071041 A1* | 3/2014 | Fujimaki | G06F 3/017 345/156 |
| 2014/0351896 A1* | 11/2014 | Koo | G06F 21/84 726/4 |
| 2015/0264220 A1* | 9/2015 | Tsukada | H04N 1/00498 358/1.13 |

(Continued)

FOREIGN PATENT DOCUMENTS

| | | |
|---|---|---|
| JP | 2003-122721 A | 4/2003 |
| JP | 2008-217716 A | 9/2008 |

(Continued)

*Primary Examiner* — Hilina K Demeter
(74) *Attorney, Agent, or Firm* — Oliff PLC

(57) ABSTRACT

An head mounted display (HMD) including an image display unit, a camera, a storage unit configured to store information about an image of a object and character information in association with the image of the object, an image detection unit configured to detect an image of a object from a captured image of the camera, a character string generating unit configured to retrieve character information in association with the image of the object detected by the image detection unit from the storage unit, and to arrange a character or character string represented by the retrieved character information in detection order of the object to generate a character string, and an input controller configured to input the character string generated by the character string generating unit to an input area arranged in a user interface.

6 Claims, 10 Drawing Sheets

145

| No. | INPUT IMAGE | INPUT CHARACTER STRING | * DESCRIPTION OF CHARACTER STRING |
|---|---|---|---|
| 1 | IMAGE NO. 1 (DRIVER'S LICENSE) | Taro | MY NAME (ENGLISH CHARACTERS) |
| 2 | IMAGE NO. 2 (PICTURE OF MOBILE PHONE) | 090-XXXX-YYYY | PHONE NUMBER (NUMBER) |
| 3 | IMAGE NO. 3 (PICTURE OF CHILD) | 20180101 | CHILD'S DATE OF BIRTH (NUMBER) |
| 4 | IMAGE NO. 4 (PICTURE OF PET) | Liberty | FAVORITE PHRASE (ENGLISH CHARACTERS) |
| 5 | IMAGE NO. 5 (PICTURE OF FAMILY) | Susi | NAME OF FAVORITE FOOD (ENGLISH CHARACTERS) |
| 6 | IMAGE NO. 6 (PICTURE OF MY HAND) | KeyCode"Enter" | RETURN KEY CODE |
| ⋮ | ⋮ | ⋮ | ⋮ |

(56) References Cited

U.S. PATENT DOCUMENTS

| | | | |
|---|---|---|---|
| 2016/0049012 A1* | 2/2016 | Torii | G01C 21/206 |
| | | | 345/633 |
| 2016/0140728 A1* | 5/2016 | Aonuma | G02B 27/017 |
| | | | 382/103 |
| 2017/0026831 A1* | 1/2017 | Jung | H04W 12/065 |
| 2017/0115839 A1* | 4/2017 | Park | G06F 3/017 |
| 2017/0324726 A1* | 11/2017 | Alleau | G06F 3/0426 |

FOREIGN PATENT DOCUMENTS

| | | |
|---|---|---|
| JP | 2010-182056 A | 8/2010 |
| JP | 2014-52942 A | 3/2014 |

* cited by examiner

145

| No. | INPUT IMAGE | INPUT CHARACTER STRING | * DESCRIPTION OF CHARACTER STRING |
|---|---|---|---|
| 1 | IMAGE NO. 1 (DRIVER'S LICENSE) | Taro | MY NAME (ENGLISH CHARACTERS) |
| 2 | IMAGE NO. 2 (PICTURE OF MOBILE PHONE) | 090-XXXX-YYYY | PHONE NUMBER (NUMBER) |
| 3 | IMAGE NO. 3 (PICTURE OF CHILD) | 20180101 | CHILD'S DATE OF BIRTH (NUMBER) |
| 4 | IMAGE NO. 4 (PICTURE OF PET) | Liberty | FAVORITE PHRASE (ENGLISH CHARACTERS) |
| 5 | IMAGE NO. 5 (PICTURE OF FAMILY) | Susi | NAME OF FAVORITE FOOD (ENGLISH CHARACTERS) |
| 6 | IMAGE NO. 6 (PICTURE OF MY HAND) | KeyCode"Enter" | RETURN KEY CODE |
| ⋮ | ⋮ | ⋮ | ⋮ |

Fig. 5

HEAD-MOUNTED DISPLAY APPARATUS, AUTHENTICATION SYSTEM, AND METHOD FOR CONTROLLING HEAD-MOUNTED DISPLAY APPARATUS

BACKGROUND

1. Technical Field

The invention relates to a head-mounted display apparatus, an authentication system, and a method for controlling the head-mounted display apparatus.

2. Related Art

There has been proposed means for facilitating input operations of authentication information such as password (for example, see JP-A-2008-217716). JP-A-2008-217716 discloses a method including displaying an authentication image in which a plurality of objects is arranged and generating an authentication key including information about a touching order to the objects.

In the configuration of JP-A-2008-217716, the authentication key including a touching order of the objects makes it difficult to be applied to entering information constituted by a character string.

SUMMARY

An advantage of some aspects of the invention is to alleviate the burden of operations related to entering a character string having confidentiality.

In order to achieve the above-described objective, the head-mounted display apparatus of the invention includes a display unit to be mounted on a head of a user and configured to transmit an outside view to be visually recognizable, a capturing unit configured to capture an image of a range including the outside view transmitted through the display unit to be visually recognizable, a storage unit configured to store information about an image of a object and character information in association with the image of the object, an image detection unit configured to detect an image of the object from a captured image of the capturing unit, a character string generating unit configured to retrieve character information in association with the image of the object detected by the image detection unit from the storage unit, and to arrange a character or character string represented by the retrieved character information in detection order of the object to generate a character string, and an input controller configured to cause the display unit to display a user interface for character input and to cause the character string generated by the character string generating unit to be input to an input area arranged in the user interface.

The invention allows a character string to be entered with a simple operation and without impairing the confidentiality of a character string, alleviating the burden of operations of entering a character string.

The invention may also employ a configuration including an authentication unit configured to authenticate a character string input by the input controller as a target, wherein the storage unit is configured to store a preset character string for authentication, and the authentication unit is configured to compare the character string input by the input controller with the character string for authentication stored in the storage unit to perform authentication.

The above configuration alleviates the burden of operations of entering a character string for authentication.

The invention may also employ a configuration including a communication unit configured to perform communication, and a communication controller configured to cause the communication unit to send a character string input by the input controller together with an authentication request and to cause the communication unit to receive an authentication result.

The above configuration alleviates, in a case when authentication is performed using an external device, the burden of operations of entering a character string for authentication.

The invention may also employ a configuration in which the image of the object is an image of a hand of the user and is constituted by a combination of images of a plurality of hands having different shapes, and the character string generating unit is configured to generate, in response to a detection of images of a plurality of hands having different shapes by the image detection unit, a character or a character string represented by the character information corresponding to the combination of the images of hands having been detected.

The above configuration allows a character string to be readily entered through a gesture by the hand of the user.

The invention may also employ a configuration in which the image of the object is an image of a hand of the user, the hand having a predefined shape, and the character string generating unit is configured to generate, in response to a detection of an image of a hand having a predefined shape by the image detection unit, a character string corresponding to the image of the hand having been detected.

The above configuration allows a character string to be readily entered through an entry by way of the shape of a hand.

An authentication system of the invention includes a head-mounted display apparatus including a first communication unit configured to perform communication, a display unit to be mounted on a head of a user and configured to transmit an outside view through the display unit to be visually recognizable, a capturing unit configured to capture an image of a range including the outside view transmitted through the display unit to be visually recognizable, a storage unit configured to store information about an image of a object and character information in association with the image of the object, an image detection unit configured to detect an image of the object from a captured image of the capturing unit, a character string generating unit configured to retrieve character information in association with the image of the object detected by the image detection unit from the storage unit, and to arrange a character or character string represented by the retrieved character information in detection order of the object to generate a character string, an input controller configured to cause the display unit to display a user interface for character input and to cause the character string generated by the character string generating unit to be input to an input area arranged in the user interface, a communication controller configured to cause the first communication unit to send a character string input by the input controller together with an authentication request and to cause the first communication unit to receive an authentication result, and an authentication device including a second communication unit, a second storage unit configured to store a preset character string for authentication, and an authentication unit configured to compare a character string received by the second communication unit with the character string for authentication stored in the second storage unit to perform authentication, and configured to cause the second communication unit to send an authentication result to a sender of the character string.

The invention allows, in a configuration in which the character string for authentication having been entered in the head-mounted display apparatus is authenticated by the authentication device, a character string to be entered in the head-mounted display apparatus with a simple operation and without impairing the confidentiality of the character string. This alleviates the burden of input operations of entering a character string.

The invention is also a method for controlling the head-mounted display apparatus with a display unit to be mounted on a head of a user, the method including capturing an image of a range including an outside view transmitted through the display unit to be visually recognizable, detecting an image of a object from a captured image, retrieving character information in association with the detected image of the object from a storage unit configured to store information about an image of a object and character information in association with the image of the object, arranging a character or character string represented by the retrieved character information in detection order of the object to generate a character string, and causing the display unit to display a user interface for character input and causing the character string having been generated to be input to an input area arranged in the user interface.

The invention allows a character string to be entered with a simple operation and without impairing the confidentiality of a character string, alleviating the burden of operations of entering a character string.

BRIEF DESCRIPTION OF THE DRAWINGS

The invention will be described with reference to the accompanying drawings, wherein like numbers reference like elements.

FIG. 5 is a schematic diagram illustrating a configuration example of input assistance data.

DESCRIPTION OF EXEMPLARY EMBODIMENTS

Figure 1:
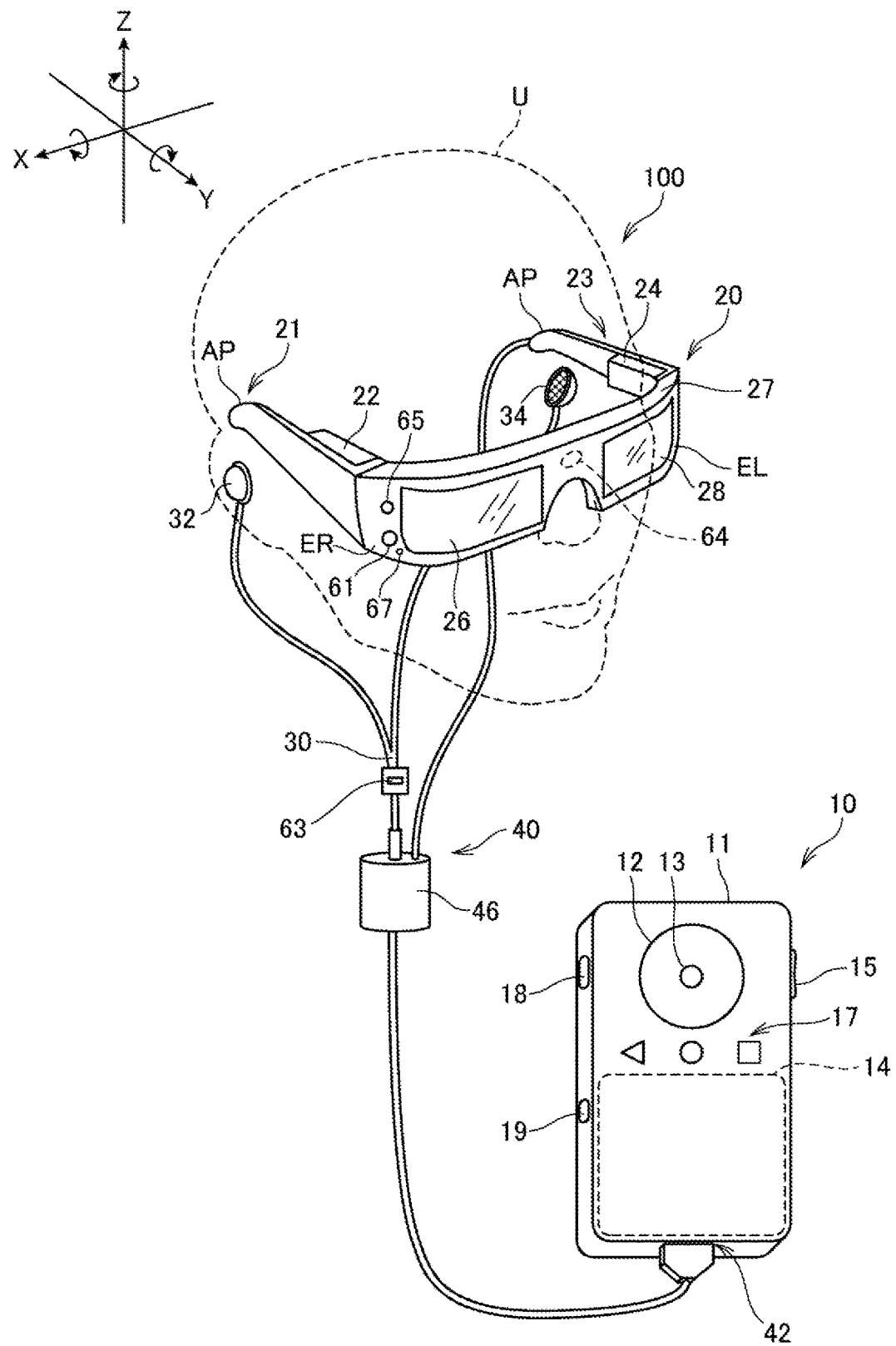
FIG. 1 is an explanatory view illustrating an external configuration of a Head Mounted Display (HMD).

Exemplary Embodiments of the invention will now be described herein with reference to the accompanying drawings. FIG. 1 is a view illustrating an external configuration of a Head Mounted Display (HMD) 100.

The HMD 100 includes an image display unit 20 and a controller 10 as a controller configured to control the image display unit 20.

The image display unit 20 having a spectacle shape in the exemplary embodiment is mounted on the head of a user U. The image display unit 20 is configured to allow the user U (operator) to view a virtual image in a state of wearing the unit. The function of the image display unit 20 causing the virtual image to be visually recognized can be referred to as "display", where the image display unit 20 corresponds to the "display unit" of the invention.

The controller 10 is configured to include, on a main body 11 in a box-shape, operation components each configured to receive an operation of the user U as described below, where the controller 10 is also configured to function as a device configured to allow the user U to operate the HMD 100.

The image display unit 20 includes a right holding part 21, a left holding part 23, a front frame 27, a right display unit 22, a left display unit 24, a right light-guiding plate 26, and a left light-guiding plate 28. The right holding part 21 and the left holding part 23 extending rearward from the both end portions of the front frame 27 cause the image display unit 20 to be held on the head of the user U. The end portion located, among the both end portions of the front frame 27, at the right side of the user U when the image display unit 20 is being worn is defined as an end portion ER, while the end portion located at the left side as an end portion EL.

The right light-guiding plate 26 and the left light-guiding plate 28 are fixed to the front frame 27. In the state of wearing the image display unit 20, the right light-guiding plate 26 is located before the right eye of the user U, while the left light-guiding plate 28 is located before the left eye of the user U.

The right display unit 22 and the left display unit 24 are modules respectively integrated into units with optical units and peripheral circuits and are each configured to emit imaging light. The right display unit 22 is attached to the right holding part 21, while the left display unit 24 is attached to the left holding part 23.

The right light-guiding plate 26 and the left light-guiding plate 28, which are optical parts made of resin or the like transmissive of light, are formed of, for example, prisms. The right light-guiding plate 26 guides the imaging light output from the right display unit 22 to the right eye of the user U, while the left light-guiding plate 28 guides the imaging light output from the left display unit 24 to the left eye of the user U. This allows the imaging light to be incident on the both eyes of the user U, causing the user U to visually recognize the image.

The HMD 100 is a see-through type display device, and imaging light guided by the right light-guiding plate 26 and external light transmitted through the right light-guiding plate 26 are incident on the right eye of the user U. Similarly, imaging light guided by the left light-guiding plate 28 and external light transmitted through the left light-guiding plate 28 are incident on the left eye of the user U. In this way, the HMD 100 superimposes the imaging lights corresponding to the internally processed images and the external lights and causes the superimposed lights to be incident on the eyes of the user U. This allows the user U to see an outside view through the right light-guiding plate 26 and the left light-guiding plate 28, enabling the image due to the imaging light to be visually recognized in a manner overlapped with the outside view.

An illuminance sensor 65 is arranged on the front frame 27 of the image display unit 20. The illuminance sensor 65 receives external light entering from the front of the user U wearing the image display unit 20.

A camera 61 (capturing unit) is arranged on the front frame 27 at a position where no external lights transmitted through the right light-guiding plate 26 and the left light-guiding plate 28 are blocked. In the example of FIG. 1, the camera 61 is arranged on the end portion ER side of the front frame 27. The camera may also be arranged on the end portion EL side, or may also be arranged at the coupling portion between the right light-guiding plate 26 and the left light-guiding plate 28.

The camera 61 is a digital camera including an image capturing element, an image capturing lens, and the like, and may be a monocular camera or a stereo camera. The image capturing element of the camera 61 can be, for example, a Charge Coupled Device (CCD) image sensor, or a Complementary MOS (CMOS) image sensor. The camera 61 is configured to perform capturing an image in accordance with the control of a controller 150 (FIG. 4), and to output the captured image data to the controller 150.

In a state where the user U is wearing the image display unit 20, the camera 61 faces the front direction of the user U. Accordingly, in the state of wearing the image display unit 20, the image capturing range (or the angle of view) of the camera 61 includes at least a part of the field of view of the user U, and more specifically, the image capturing range includes at least a part of the outside view, seen by the user U, transmitted through the image display unit 20. Furthermore, the entire field of view visually recognized by the user U, which is transmitted through the image display unit 20, may be included in the angle of view of the camera 61.

The front frame 27 is arranged with a light emitting diode (LED) indicator 67. The LED indicator 67 lights up during the operation of the camera 61, indicating that the camera 61 is being in the operation of capturing images.

The front frame 27 is provided with a distance sensor 64. The distance sensor 64 is configured to detect a distance to a object to be measured lying in a preset measurement direction. The distance sensor 64 may be a light reflecting type distance sensor including a light source, such as an LED or a laser diode, configured to emit light and a light receiver configured to receive light reflected by the object to be measured, for example. The distance sensor 64 may be an ultrasonic wave type distance sensor including a sound source configured to generate ultrasonic waves, and a detector configured to receive the ultrasonic waves reflected by the object to be measured. The distance sensor 64 may be a laser range scanner (scanning range sensor). This case allows range-scanning to be performed on a wide area including the front area of the image display unit 20.

The controller 10 and the image display unit 20 are coupled via a coupling cable 40. The main body 11 includes a connector 42 to which the coupling cable 40 is detachably coupled.

The coupling cable 40 includes an audio connector 46, where the audio connector 46 is coupled with a headset 30. The headset 30 includes a right earphone 32 and a left earphone 34 constituting a stereo headphone, and a microphone 63.

Figure 3:
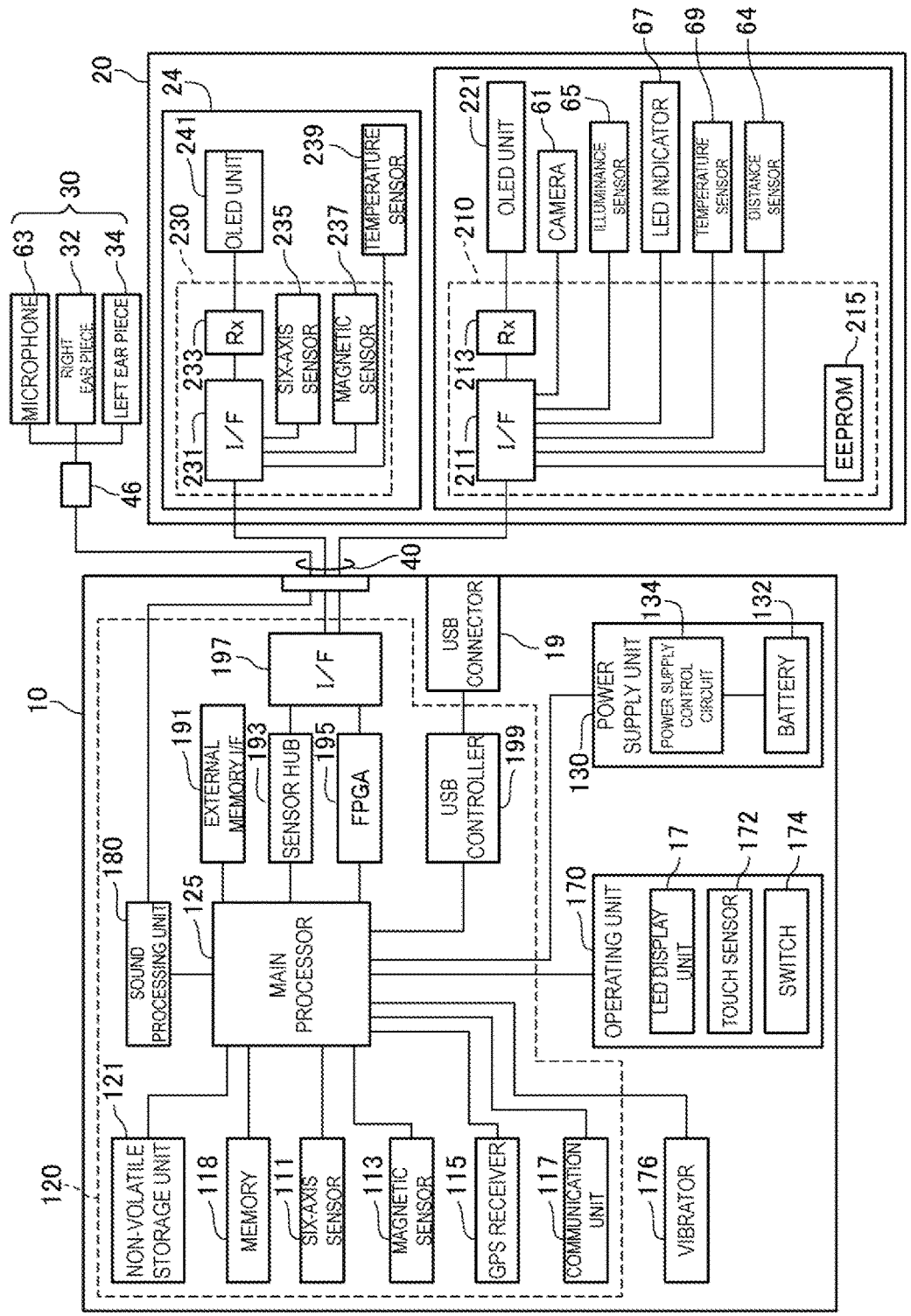
FIG. 3 is a block diagram illustrating a configuration of an HMD.

The right earphone 32 is attached to the right ear of the user U, while the left earphone 34 is attached to the left ear of the user U. The microphone 63 is configured to collect a sound and to then output a sound signal to a sound processing unit 180 (FIG. 3).

The controller 10 includes, as operation components to be operated by the user U, a wheel operation portion 12, a center key 13, an operation pad 14, an up and down key 15, and a power switch 18. These operation components are arranged on a surface of the main body 11. These operation components are operated, for example, with fingers/hands of the user U.

The operation pad 14 is configured to include an operation face for detecting a touch operation and to output an operation signal in response to an operation performed onto the operation face. The detection type on the operation face may be an electrostatic type, a pressure detection type, and an optical type, without being limited to a specific type. The operation pad 14 outputs to the controller 150 a signal indicative of a position on the operation face at which a touch is detected.

A Light Emitting Diode (LED) display unit 17 is configured to display characters, symbols, patterns, and the like formed in a light transmissive portion by tuning on the LED embedded in the light transmissive portion transmissive of light. The surface on which the display is performed forms an area where a touch operation can be detected with a touch sensor 172 (FIG. 3). Accordingly, the LED display unit 17 and the touch sensor 172 are combined to function as software keys. The power switch 18 is used to turn on or off a power supply to the HMD 100. The main body 11 includes a Universal Serial Bus (USB) connector 19 as an interface for coupling the controller 10 to external devices.

Figure 2:
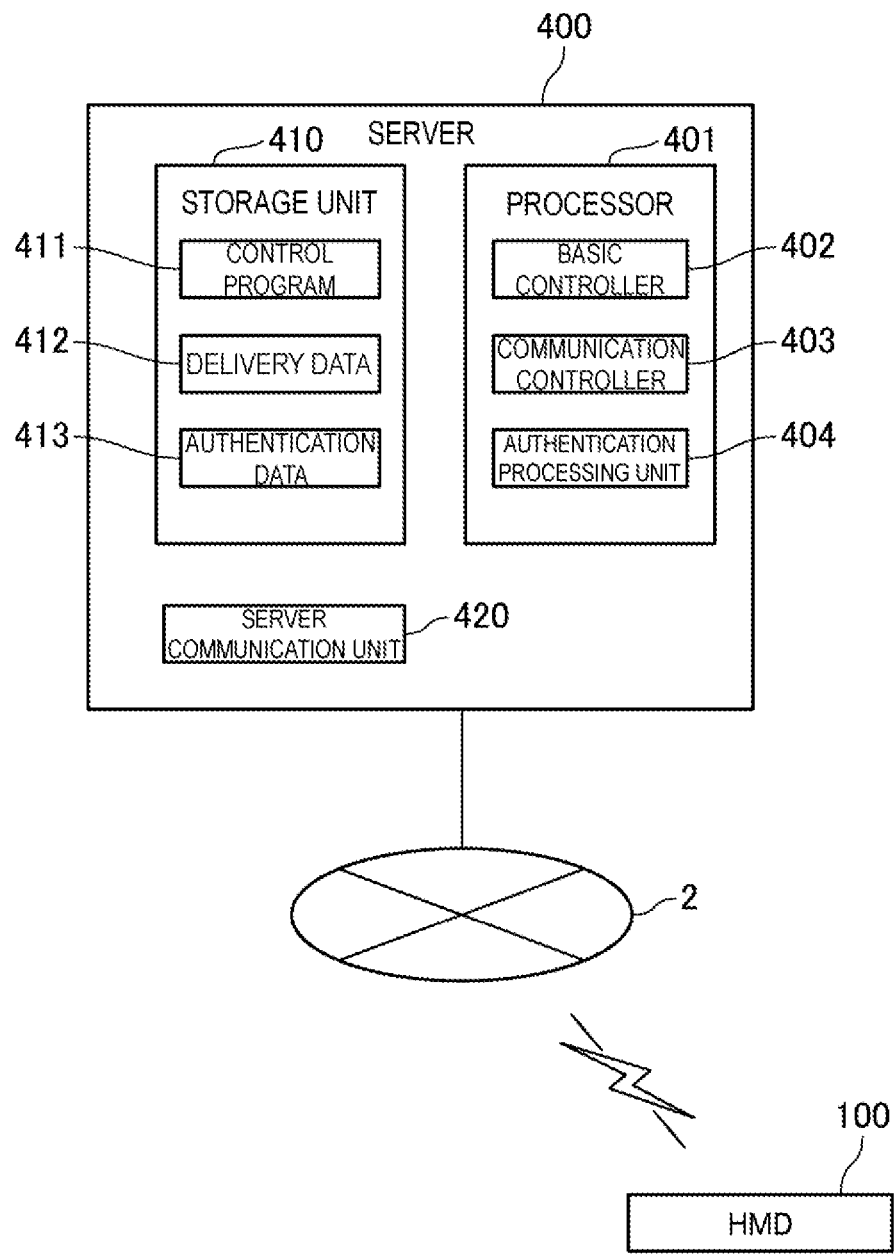
FIG. 2 is a diagram illustrating a configuration of an authentication system.

FIG. 2 is a diagram illustrating a configuration of an authentication system 1.

The authentication system 1 is configured to include the HMD 100 and a server 400. The HMD 100 is coupled to the server 400 via a communication network 2 in a manner mutually capable of data communication.

The authentication system 1 is configured to perform authentication based on information to be input to the HMD 100. The authentication system 1 is configured to perform a first authentication process in which the HMD 100 is caused to perform authentication and a second authentication process in which the server 400 is caused to perform authentication. The HMD 100 is configured to input, in the first authentication process, a character string to the user interface in accordance with the operation of the user U, and the HMD 100 is configured to perform authentication of the character string thus caused to be input. The HMD 100 is configured to input, in the second authentication process, a character string to the user interface in accordance with the operation of the user U and to send the input character string to the server 400, while the server 400 is configured to perform authentication of the character string.

In the descriptions below, the authentication system 1 is configured to be capable of performing both the first authentication process and the second authentication process, but may also be configured to be capable of performing either one of the processes alone. The first authentication process and the second authentication process may be switched to each other in any manner. For example, the HMD 100 may be configured to perform a preset process in the above two processes. The HMD 100 may also be configured such that the second authentication process is performed in a case when communicating with the server 400 is available while the first authentication process is performed in a case when communicating with the server 400 is not available. The HMD 100 may also be configured such that the second authentication process is performed in a case when a command instructing the second authentication process is received from the server 400 while the first authentication process is performed in a state that the command is not received.

The server 400 (authentication device) includes a processor 401, a storage unit 410, and a server communication unit 420. The processor 401 serves as an processing unit such as a CPU (Central Processing Unit) or a microcomputer. The processor 401, when executing a control program 411 stored in the storage unit 410, functions as a basic controller 402, a communication controller 403, and an authentication processing unit 404. These functional blocks are implemented by an operation of software and hardware cooperating with each other when the control program 411 is being executed by the processor 401.

The storage unit 410 is configured to non-volatilely store programs to be executed by the processor 401 and data to be processed by the processor 401. The storage unit 410 is configured with a non-volatile storage device such as a flash Read Only Memory (ROM) or a Hard Disc Drive (HDD), for example. The storage unit 410 may include a Random Access Memory (RAM) configuring the work area of the processor 401.

The storage unit 410 (second storage unit) is configured to store the control program 411, delivery data 412, and authentication data 413. The delivery data 412 is data that is to be delivered from the server 400 to the HMD 100 in the second authentication process. For example, the delivery data 412 is data of a web page to which a character string or the like is caused to be input in the HMD 100. This web page is displayed as a user interface by the HMD 100. An input area in which a character string is caused to be input is provided on the web page, and the character string having been input to the input area is sent from the HMD 100 to the server 400. The authentication data 413 is data for performing authentication by determining whether the data sent by the HMD 100 to the server 400 is right in the second authentication process, and includes, for example, a character string for authentication. The authentication data 413 includes, for example, normal data which is right information to be sent by the HMD 100 to the server 400. In this case, the server 400 performs authentication based on whether the data sent by the HMD 100 to the server 400 matches the authentication data 413.

The server communication unit 420 (second communication unit) is configured to perform data communication via the communication network 2 under the control of the processor 401.

The basic controller 402 is configured to control each of the components of the server 400. The communication controller 403 is configured to control the server communication unit 420 to perform data communication via the communication network 2 with the HMD 100. The authentication processing unit 404 (authentication unit) is configured to authenticate, in the second authentication process, the data received from the HMD 100 based on the authentication data 413 under the control of the communication controller 403. The authentication processing unit 404 is configured to generate data including an authentication result, and the communication controller 403 is configured to cause data including the authentication result to the HMD 100 to be sent.

FIG. 3 is a block diagram illustrating a configuration of components configuring the HMD 100.

The controller 10 includes a main processor 125 configured to execute a program to control the HMD 100. The main processor 125 is coupled with a memory 118 and a non-volatile storage unit 121. The main processor 125 is coupled with an operating unit 170 serving as an input device. The main processor 125 is further coupled with sensors, such as a six-axis sensor 111, a magnetic sensor 113, and a global positioning system (GPS) 115.

The main processor 125 is coupled with a communication unit 117, the sound processing unit 180, an external memory interface 191, a USB controller 199, a sensor hub 193, and an FPGA 195. These components function as interfaces to external devices.

The main processor 125 is mounted on a controller substrate 120 build into the controller 10. In the exemplary embodiment, the controller substrate 120 is mounted with the six-axis sensor 111, the magnetic sensor 113, the GPS 115, the communication unit 117, the memory 118, the non-volatile storage unit 121, and the sound processing unit 180, for example. The external memory interface 191, the sensor hub 193, the FPGA 195, and the USB controller 199 may be mounted on the controller substrate 120. The USB connector 19, the connector 42, and an interface 197 may be mounted on the controller substrate 120.

The memory 118 configures a work area used to temporarily store a program to be executed by the main processor 125 and data to be processed by the main processor 125, for example. The non-volatile storage unit 121 is configured by a flash memory or an embedded Multi Media Card (eMMC). The non-volatile storage unit 121 is configured to store programs to be executed by the main processor 125 and data to be processed by the main processor 125.

The operating unit 170 includes the LED display unit 17, the touch sensor 172, and a switch 174. The touch sensor 172 is configured to detect a touch operation performed by the user U, to specify the operation position, and to then output operation signals to the main processor 125. The switch 174 is configured to output operation signals to the main processor 125 in response to the operations of the up and down key 15 and the power switch 18. The LED display unit 17 is configured to follow a control by the main processor 125 to turn on or off the LEDs, as well as to cause the LEDs to blink. The operating unit 170, which is configured by, for example, a switch board on which the LED display unit 17, the touch sensor 172, the switch 174, and circuits for controlling these components are mounted, is housed in the main body 11.

The six-axis sensor 111 is an example of a motion sensor (inertial sensor) configured to detect a motion of the controller 10. The six-axis sensor 111 includes a three-axis acceleration sensor configured to detect accelerations in the directions of three axes indicated by X, Y, and Z in FIG. 1 and a three-axis gyro sensor configured to detect angular velocities of the rotations around X, Y, and Z axes. The six-axis sensor 111 may be an Inertial Measurement Unit (IMU) with the sensors, described above, formed into a module. The magnetic sensor 113 is a three-axis geomagnetic sensor, for example.

A Global Positioning System (GPS) 115 is a position detector configured to receive GPS signals sent from GPS satellites and then to detect or calculate the coordinates of the current position of the controller 10.

The six-axis sensor 111, the magnetic sensor 113, and the GPS 115 output values to the main processor 125 in accordance with a sampling period specified beforehand. The six-axis sensor 111, the magnetic sensor 113, and the GPS 115 may also output detected values to the main processor 125 at the timings designated by the main processor 125 in response to the requests from the main processor 125.

The communication unit 117 (first communication unit, communication unit) is a communication device configured to perform wireless communications with an external device. The communication unit 117 includes, for example, an antenna, an RF circuit, a baseband circuit, and a communication control circuit (not illustrated), and may be a device or a communication module board formed by being integrated with these components.

When the authentication system 1 performs the second authentication process, the communication unit 117 performs data communication with the server 400 via the communication network 2 (FIG. 2).

The communication schemes of the communication unit 117 include Wi-Fi (trade name), Worldwide Interoperability for Microwave Access (WiMAX; trade name, Bluetooth (trade name), Bluetooth Low Energy (BLE), Digital Enhanced Cordless Telecommunications (DECT), ZigBee (trade name), and Ultra-Wide Band (UWB).

The sound processing unit 180, which is coupled to the audio connector 46, performs input/output of sound signals and encoding/decoding of sound signals. The sound processing unit 180 may include an A/D converter configured to convert analog sound signals into digital sound data, and a D/A converter configured to convert the digital sound data into the analog sound signals.

The external memory interface 191 serves as an interface configured to be coupled with a portable memory device and includes an interface circuit and a memory card slot configured to be attached with a card-type recording medium to read data, for example.

The controller 10 is mounted with a vibrator 176. The vibrator 176 includes, for example, a motor equipped with an eccentric rotor, and generates vibrations under the control of the main processor 125.

The interface (I/F) 197 couples the sensor hub 193 and the Field Programmable Gate Array (FPGA) 195 to the image display unit 20. The sensor hub 193 is configured to acquire detected values of the sensors included in the image display unit 20 and output the detected values to the main processor 125. The FPGA 195 is configured to process data to be transmitted and received between the main processor 125 and components of the image display unit 20, as well as to execute transmissions via the interface 197.

With the coupling cable 40 and wires (not illustrated) inside the image display unit 20, the controller 10 is separately coupled with the right display unit 22 and the left display unit 24.

The right display unit 22 includes an Organic Light Emitting Diode (OLED) unit 221 configured to emit imaging light. The imaging light emitted by the OLED unit 221 is guided to the right light-guiding plate 26 by an optical system including a lens group, for example. The left display unit 24 includes an OLED unit 241 configured to emit imaging light. The imaging light emitted by the OLED unit 241 is guided to the left light-guiding plate 28 by an optical system including a lens group, for example.

The OLED units 221 and 241 each include drive circuits configured to drive an OLED panel. The OLED panel is a light emission type display panel including light-emitting elements arranged in a matrix pattern and configured to emit red (R) color light, green (G) color light, and blue (B) color light, respectively, by means of organic electro-luminescence. The OLED panel includes a plurality of pixels each including an R element, a G element, and a B element arranged in a matrix pattern, and is configured to form an image. The drive circuits are controlled by the controller 150 to select and power the light-emitting elements included in the OLED panel to cause the light-emitting elements included in the OLED panel to emit light. This allows the imaging lights of the image formed on the OLED units 221 and 241 to be guided to the right light-guiding plate 26 and the left light-guiding plate 28, and to be then incident on the right and left eyes of the user U.

The right display unit 22 includes a display unit substrate 210. The display unit substrate 210 is mounted with an interface (I/F) 211 coupled to the interface 197, a receiver (Rx) 213 configured to receive data entered from the controller 10 via the interface 211, and an electrically erasable programmable read only memory (EEPROM) 215. The interface 211 couples the receiver 213, the EEPROM 215, a temperature sensor 69, the camera 61, the illuminance sensor 65, and the LED indicator 67 to the controller 10.

The Electrically Erasable Programmable Read Only Memory (EEPROM) 215 is configured to store data in a manner readable by the main processor 125. The EEPROM 215 stores data about a light-emitting property and a display property of the OLED units 221 and 241 included in the image display unit 20, and data about a property of a sensor included in the right display unit 22 or the left display unit 24, for example. Specifically, the EEPROM 215 stores parameters regarding Gamma correction performed by the OLED units 221 and 241 and data used to compensate for detected values of the temperature sensor 69 and a temperature sensor 239, for example. The data is generated when the HMD 100 is inspected before shipping from a factory, and written into the EEPROM 215. After shipped, the main processor 125 can use the data in the EEPROM 215 for performing processing.

The camera 61 follows a signal entered via the interface 211, executes imaging, and outputs captured image data or a signal indicative of the result of capturing image to the interface 211.

The illuminance sensor 65 is configured to output a detected value corresponding to an amount of received light to the interface 211. The LED indicator 67 follows a signal to be entered via the interface 211 to come on or go off.

The temperature sensor 69 is configured to detect the temperatures and to output voltage values or resistance values each corresponding to the detected temperatures to the interface 211 as detected values. The temperature sensor 69 is mounted on a rear face of the OLED panel included in the OLED unit 221 or a substrate mounted with the drive circuits configured to drive the OLED panel to detect a temperature of the OLED panel. In a case when the OLED panel is mounted as an Si-OLED together with the drive circuits and the like to form an integrated circuit on an integrated semiconductor chip, the temperature sensor 69 may be mounted on the semiconductor chip.

The receiver 213 is configured to receive data sent by the main processor 125 via the interface 211. Upon receiving image data via the interface 211, the receiver 213 outputs the received image data to the OLED unit 221.

The left display unit 24 includes a display unit substrate 230. The display unit substrate 230 is mounted with an interface (I/F) 231 coupled to the interface 197 and a receiver (Rx) 233 configured to receive data entered by the controller 10 via the interface 231. The display unit substrate 230 is further mounted with a six-axis sensor 235 and a magnetic sensor 237. The interface 231 couples the receiver 233, the six-axis sensor 235, the magnetic sensor 237, and the temperature sensor 239 to the controller 10.

The six-axis sensor 235 is an example of a motion sensor configured to detect a motion of the image display unit 20. Specifically, the six-axis sensor 235 includes a three-axis acceleration sensor configured to detect accelerations in the X, Y, and Z axial directions in FIG. 1 and a three-axis gyro sensor configured to detect accelerations of the rotations around the X, Y, and Z axes. The six-axis sensor 235 may be an IMU with the sensors, described above, formed into a module. The magnetic sensor 237 is a three-axis geomagnetic sensor, for example.

The temperature sensor 239 is configured to detect the temperatures and to output voltage values or resistance values each corresponding to the detected temperatures to the interface 231 as detected values. The temperature sensor 239 is mounted on a rear face of the OLED panel included in the OLED unit 241 or a substrate mounted with the drive circuits configured to drive the OLED panel to detect a temperature of the OLED panel. In a case when the OLED panel is mounted as an Si-OLED together with the drive circuits and the like to form an integrated circuit on an integrated semiconductor chip, the temperature sensor 239 may be mounted on the semiconductor chip.

The camera 61, the illuminance sensor 65, the temperature sensor 69, the six-axis sensor 235, the magnetic sensor 237, and the temperature sensor 239 are coupled to the sensor hub 193 of the controller 10.

The sensor hub 193 is configured to follow a control by the main processor 125 and set and initialize sampling periods of the sensors. In synchronization with the sampling periods of the sensors, the sensor hub 193 supplies power to the sensors, sends control data, and acquires detected values, for example. At a preset timing, the sensor hub 193 outputs detected values of the sensors to the main processor 125. The sensor hub 193 may include a function of temporarily holding detected values of the sensors in conformity to a timing of output to the main processor 125. The sensor hub 193 may include a function of converting data in a format into data in a unified data format corresponding to a difference in signal format of output values of the sensors or in data format, and outputting the converted data to the main processor 125.

The sensor hub 193 follows a control by the main processor 125, turns on or off power to the LED indicator 67, and allows the LED indicator 67 to come on or blink at a timing when the camera 61 starts or ends image capturing.

The controller 10 includes a power supply unit 130 and is configured to operate with power supplied from the power supply unit 130. The power supply unit 130 includes a rechargeable battery 132 and a power supply control circuit 134 configured to detect a remaining amount of the battery 132 and control charging to the battery 132.

The USB controller 199 is configured to function as a USB device controller, establish a communication with a USB host device coupled to the USB connector 19, and perform data communications. In addition to the function of the USB device controller, the USB controller 199 may include a function of a USB host controller.

Figure 4:
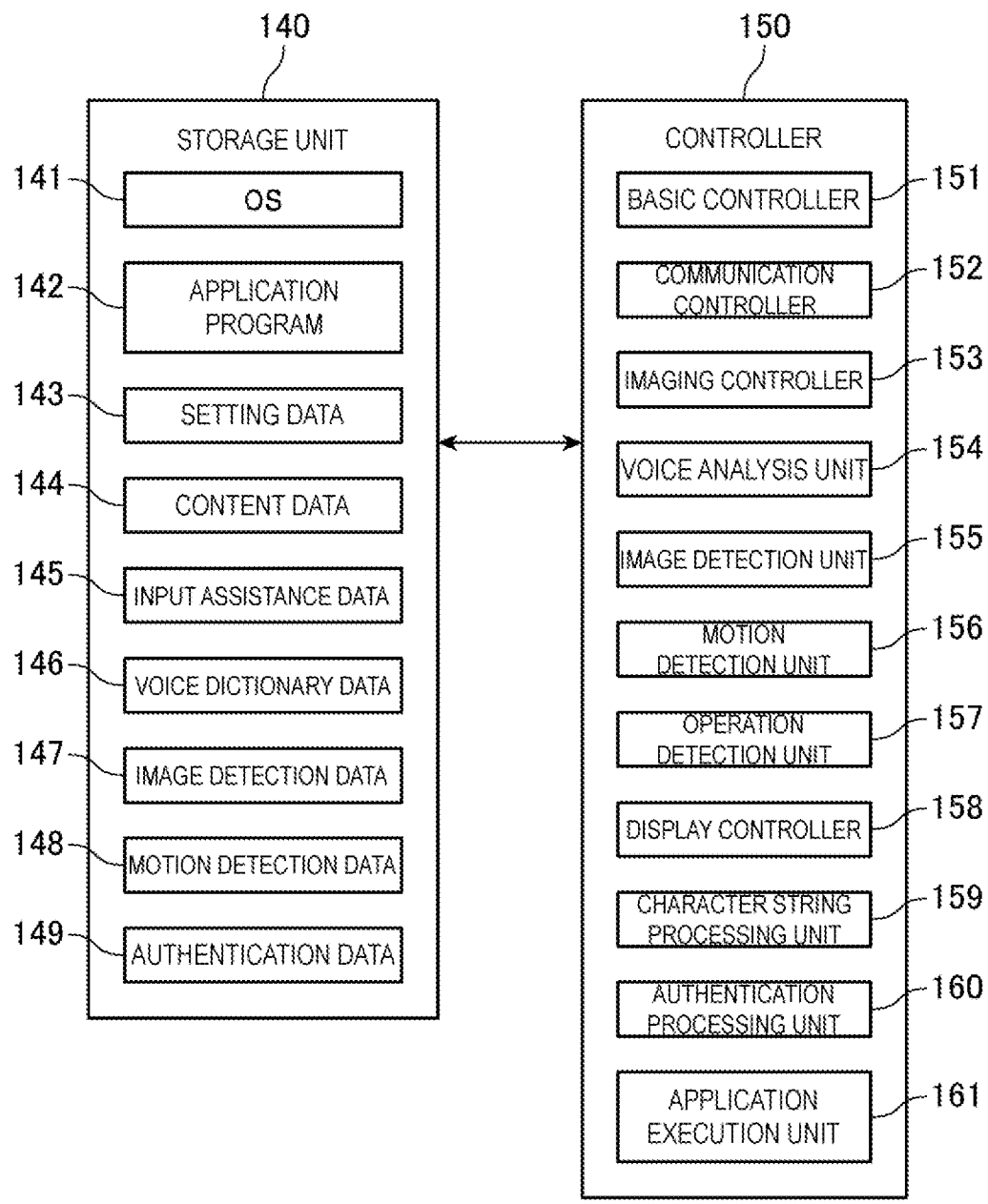
FIG. 4 is a functional block diagram of a control system of an HMD.

FIG. 4 is a functional block diagram of a storage unit 140 and the controller 150 both configuring a control system of the HMD 100. The storage unit 140 illustrated in FIG. 4 is a logical storage unit including the non-volatile storage unit 121 (FIG. 3) and may include the EEPROM 215. The controller 150 and various functional units included in the controller 150 are achieved when, as the main processor 125 executes a program, software and hardware work each other. The controller 150 and the functional units configuring the controller 150 are achieved with the main processor 125, the memory 118, and the non-volatile storage unit 121, for example.

The storage unit 140 is configured to store various programs to be executed by the main processor 125 and data to be processed with the programs. The storage unit 140 is configured to store an operating system (OS) 141, an application program 142, setting data 143, and content data 144.

The controller 150 is configured to process, by executing the program stored in the storage unit 140, the data stored in the storage unit 140 to control the HMD 100.

The operating system 141 represents a basic control program for the HMD 100. The operating system 141 is executed by the main processor 125. The main processor 125, when the power switch of the HMD 100 is turned on by an operation of the power switch 18, loads and executes the operating system 141. As the main processor 125 executes the operating system 141, various functions of the controller 150 are implemented. The functions of the controller 150 include various functions implemented by a basic controller 151, a communication controller 152, an imaging controller 153, a voice analysis unit 154, an image detection unit 155, a motion detection unit 156, an operation detection unit 157, a display controller 158, and an application execution unit 161.

The application program 142 is a program executed by the main processor 125 while the main processor 125 is executing the operating system 141. The application program 142 uses the various functions of the controller 150. In addition to the application program 142, the storage unit 140 may store a plurality of programs. For example, the application program 142 is a program for implementing functions such as image content playback, voice content playback, games, camera shooting, document creation, web browsing, schedule management, voice communication, image communication, and route navigation.

The setting data 143 includes various set values regarding operation of the HMD 100. The setting data 143 may include parameters, determinants, computing equations, look-up tables (LUTs), and the like used when the controller 150 controls the HMD 100.

The setting data 143 also includes data used when the application program 142 is executed. More specifically, the setting data 143 includes data such as execution conditions for executing various programs included in the application program 142. For example, the setting data 143 includes data indicating, for example, the image display size at the time when the application program 142 is executed, the orientation of the screen, the functional units of the controller 150 used by the application program 142, or the sensors of the HMD 100.

The HMD 100, when the application program 142 is to be installed, executes the installation process with the function of the controller 150. The installation process includes a process of storing the application program 142 in the storage unit 140, as well as a process of setting execution conditions of the application program 142 and the like. The installation process causes the setting data 143 corresponding to the application program 142 to be generated or stored in the storage unit 140, then the application execution unit 161 allows the application program 142 to be executed.

The content data 144 is data of contents including images and videos to be displayed by the image display unit 20 under the control of the controller 150. The content data 144 includes still image data, video (moving image) data, sound data, and the like. The content data 144 may include data of a plurality of contents.

Input assistance data 145 are data for assisting a data input operation using the HMD 100. The HMD 100 of the exemplary embodiment has a function of assisting the operation of inputting data by the user U. Specifically, the HMD 100 provides a function of causing a character string stored beforehand to be input in response to an operation of the user U to cause the camera 61 to capture an image. The above function allows the user U to readily enter a character string compared to the operation of entering characters one by one.

FIG. 5 is a schematic diagram illustrating a configuration example of the input assistance data 145.

In this example, the input assistance data 145 stores an image to be input and an input character string as data to be input in association with the image. Although FIG. 5 illustrates the description of the input character string included in the input assistance data 145, the input assistance data 145 is not required to include information about the description of the character string.

The image to be input is required to be an image to be input by the user U in the HMD 100, where, in the exemplary embodiment, the image shall be, as an example, an image to be captured by the camera 61. The controller 150 is configured to detect the image of the subject included in a captured image of the camera 61. At this time, in response to a detection of an image set in the input assistance data 145 by the controller 150, an input character string included in the input assistance data 145 is caused to be input.

The image of the subject to be detected by the controller 150 from the camera 61 may be any type of image. Accordingly, the input image set in the input assistance data 145 may also be any type of image. For example, the input image may be an image itself, for example, an imaged code such as a QR code (trade name) or a bar code, or may also be a captured image of a character, a number, a geometric pattern, an image, or other figures that makes no sense as a code. The input image may also be a captured image of a certificate such as an ID card or a driver's license. The input image may also be a captured image of finger, hand, foot, other body parts of the user U, an indicator for operation, or various types of articles including products for daily use, or may be a captured image of a building.

In a case where the input image is a captured image of a subject, the camera 61 may be used to capture captured images of subjects as images to be input in addition to the case where the camera 61 is used to capture images of subjects.

For example, the input image No. 4 registered in the input assistance data 145 in FIG. 5 is a picture of a pet, and the input character string is "Liberty". In this example, in a case when the camera 61 is used to capture a picture of a pet registered as the input image No. 4, the character string "Liberty" is caused to be input. In a case where a pet identical to the pet in the image registered as the input image No. 4 is captured by the camera 61 in the same manner as in the input image No. 4 as well, the character string "Liberty" is caused to be input.

The input assistance data 145 may be set with input character strings irrespective of character types such as numbers, characters, or symbols, and languages. For example, the input assistance data 145 may be set with all characters capable of being represented by character code as input character strings.

Furthermore, the input assistance data 145 may also employ key codes as input character strings. In the example of FIG. 5, the key code of "Enter" corresponding to the return key is set as an input character string in association with the image No. 6. The HMD 100 causes the key code corresponding to the Enter key to be input on the condition that the image No. 6 is caused to be input. The key code settable in the input assistance data may be a "tab" key code or the like, without being limited to the example of FIG. 5. The key code settable to the input assistance data may also be a code obtained by combining the Ctrl key and another key. For example, a key code that functions as a command by the combination of the Ctrl key and another character key like the "Ctrl" key code+the "c" key code corresponding to the combination of the Ctrl key and the character key "c" may be assigned.

The function of the input character string is determined corresponding to the user interface. In a user interface having an input area to which characters are entered, the key code of the Enter corresponds in many cases to an input for confirming a character string having been input to the input area. A key code set in the input assistance data 145 as the input character string allows an operation of entering an image by the camera 61 to perform an input for confirming the input character string.

The input using the input assistance data 145 allows the controller 150 to cause an input character string to be input on the condition that an image matching an input image of the input assistance data 145 is input by the camera 61. This condition is matching of images, and is not matching of subjects. Accordingly, even if an image of a subject identical to that of an input image is input by the camera 61, the input character string is not caused to be input when the subject is recognized as a different image, for example, in a case when the shape or the status of the subject differs. For example, in a case when an input image of the input assistance data 145 is an image of a hand having a specific shape, the input character string is caused to be input on the condition that an image of a hand extracted from a captured image of the camera 61 is an image of a hand having the same shape as the input image set in the input assistance data 145. This case allows the camera 61 to capture, as an image, a hand shaped to a specific shape to cause a character string to be entered. Accordingly, the user U can cause a character string to be entered by performing a gesture input by shaping the hand into a specific shape.

The input assistance data 145 may include data for determining whether an image extracted from a captured image of the camera 61 matches an image set as an input image. For example, the input assistance data 145 includes an image characteristic amount of an input image and data for comparing an input image with another image by pattern matching.

Further, the input assistance data 145 can include a plurality of images as input images. Specifically, a combination of a plurality of images continuously input by the camera 61 is set as one input image in the input assistance data 145. In this case, an input character string set in the input assistance data 145 is caused to input on the condition that a plurality of images each of which extracted from a plurality of captured images successively captured by the camera 61 at a predefined cycle corresponds to input images set in the input assistance data 145.

For example, a plurality of images of hands having different shapes can be set as input images in the input assistance data 145. In this case, a character string is allowed to be input on the condition that the camera 61 causes images of hands in different shapes to be successively captured. That is, the shapes of the hand are changed in a specific order to be captured by the camera 61, to thus cause a character string to be entered. This allows the user U performing gesture inputs of changing the shapes of the hand to enter a character string.

Turning back to FIG. 4, voice dictionary data 146 is data for enabling the controller 150 to analyze a voice of the user U collected by the microphone 63. For example, the voice dictionary data 146 includes dictionary data for converting the digital data of the voice of the user U into texts of Japanese, English or other languages that are set.

Image detection data 147 is reference data for enabling the controller 150 to analyze captured image data of the camera 61 to detect an image of a specific subject included in the captured image data. The specific subject may be, for example, an indicator used for gesture operation such as finger, hand, foot, other body parts of the user U, or an indicator for operation. The image detection data 147 also includes data for detecting and extracting an image set as an input image in the input assistance data 145 or a subject of an input image from a captured image captured by the camera 61.

Motion detection data 148 includes data for detecting the motion of the image display unit 20 as an input operation. For example, the motion detection data 148 includes data for determining whether a change in detected values of the six-axis sensor 111 and/or the six-axis sensor 235 corresponds to a predefined pattern. A plurality of motion patterns may be included in the motion detection data 148.

Authentication data 149 is data for the HMD 100 to perform authentication in the first authentication process. The authentication data 149 includes, for example, normal data to be compared with data such as a character string having been input to the user interface displayed by the HMD 100. In this case, the controller 150 causes the data such as a character string having been input to the user interface to be compared with the authentication data 149, and performs authentication based on the matching result.

The basic controller 151 executes a basic function for controlling the components of the HMD 100. When the power of the HMD 100 is turned on, the basic controller 151 executes a start-up process and initializes each of the components of the HMD 100, then the application execution unit 161 causes the application program 142 to be in a state of being executable. The basic controller 151 executes a shut-down process of turning off the power supply of the controller 10, terminates the operations of the application execution unit 161, updates various data stored in the storage unit 140, and causes the HMD 100 to be stopped. In the shut-down process, the power supply to the image display unit 20 also stops, wholly shutting down the HMD 100.

The basic controller 151 has a function of controlling the power supply performed by the power supply unit 130. With the shut-down process, the basic controller 151 separately turns off power supplied from the power supply unit 130 to each of the components of the HMD 100.

The communication controller 152 is configured to control the communication unit 117 to execute data communications with other devices.

For example, the communication controller 152 receives the content data supplied from a non-illustrated image supply device such as a personal computer with the communication unit 117, and causes the received content data to be stored in the storage unit 140 as the content data 144.

The imaging controller 153 is configured to control the camera 61 to perform capturing of an image, to generate captured image data, and to temporarily store the captured image data in the storage unit 140. In a case when the camera 61 is configured as a camera unit including a circuit configured to generate captured image data, the imaging controller 153 is configured to acquire the captured image data from the camera 61 and to temporarily store the captured image data in the storage unit 140.

The voice analysis unit 154 is configured to analyze the digital data of the voice collected with the microphone 63 and to execute a voice recognition process of converting the digital data into texts by referring to the voice dictionary data 146.

The image detection unit 155 is configured to analyze the captured image data captured under the control of the imaging controller 153 with reference to the image detection data 147 to detect an input operation image from the captured image data.

The motion detection unit 156 is configured to detect a motion of the image display unit 20 based on the detected values of the six-axis sensor 235 and/or the six-axis sensor 111.

The operation detection unit 157 is configured to detect an operation on the operating unit 170.

The display controller 158 is configured to generate control signals for controlling the right display unit 22 and the left display unit 24, and to control the generation and emission of the imaging light by each of the right display unit 22 and the left display unit 24. For example, the display controller 158 is configured to cause the OLED panel to display an image, and to perform a control of drawing timing of the OLED panel, a control of luminance, and the like. The display controller 158 is configured to control the image display unit 20 to cause an image to be displayed.

The display controller 158 is also configured to execute an image process of generating signals to be sent to the right display unit 22 and the left display unit 24. The display controller 158 is configured to generate a vertical synchronization signal, a horizontal synchronization signal, a clock signal, an analog image signal, and the like based on the image data of the image or video to be displayed by the image display unit 20.

The display controller 158 may be configured to perform, as necessary, a resolution conversion process of converting the resolution of the image data into a resolution suitable for the right display unit 22 and the left display unit 24. The display controller 158 may be configured to perform, for example, an image adjustment process of adjusting the luminance and chromaticness of image data, and a 2D/3D conversion process of creating 2D image data from 3D image data or of creating 3D image data from 2D image data. The display controller 158 is configured to generate, when having performed these image processes, signals for displaying images based on the processed image data, and to send the signals to the image display unit 20.

The display controller 158 may be configured with a configuration realized by the main processor 125 executing the operating system 141, or with a hardware different from the main processor 125. The hardware may be a Digital Signal Processor (DSP), for example.

A character string processing unit 159 (character string generating unit) determines whether an image detected by the image detection unit 155 corresponds to an input image of the input assistance data 145, and in a case when the image corresponds to the input image, the character string processing unit 159 causes the input character string set in the input assistance data 145 in association with the input image to be input to the user interface. In a case when a character string has already been input to the user interface, the character string processing unit 159 subsequently causes another character string to be input. In a case when a plurality of input images is caused to be input, the character string processing unit 159 causes the input character strings set in the input assistance data 145 in association with the input images to be input to the user interface in accordance with the input order of the input images.

For example, in relation with the input assistance data 145 illustrated in FIG. 5, in a case when the image No. 3 is caused to be input, the character string processing unit 159 causes the input character string "20180101" to be input to the user interface. Thereafter, in a case where the image No. 1 is caused to be input, the character string processing unit 159 causes the input character string "Taro" corresponding to the image No. 1 to be subsequently input after the character string "20180101" having already been input. This allows "20180101Taro" to be input to the user interface.

An authentication processing unit 160 (authentication unit) is configured to perform authentication based on the information having been input to the user interface. The authentication processing unit 160 is configured to compare, in the first authentication process, the character string input by the character string processing unit 159 to the user interface with the authentication data 149 to perform authentication. The authentication processing unit 160 is also configured to cause, in the second authentication process, the control of the communication controller 152 to send the character string having been input to the user interface by the character string processing unit 159 to the server 400. This case allows the authentication processing unit 160 to analyze the data including an authentication result sent from the server 400, and to output the authentication result.

The application execution unit 161 corresponds to a function of executing the application program 142 while the main processor 125 is executing the operating system 141. The application execution unit 161 executes the application program 142 to implement various functions of the application program 142. For example, when any one of the content data 144 stored in the storage unit 140 is selected by an operation of the operating unit 170, the application program 142 for reproducing the content data 144 is executed. This allows the controller 150 to operate as the application execution unit 161 configured to reproduce the content data 144.

Next, operations of the HMD 100 will be described. In the operations described below, the controller 150 functions as an input controller.

Figure 6:
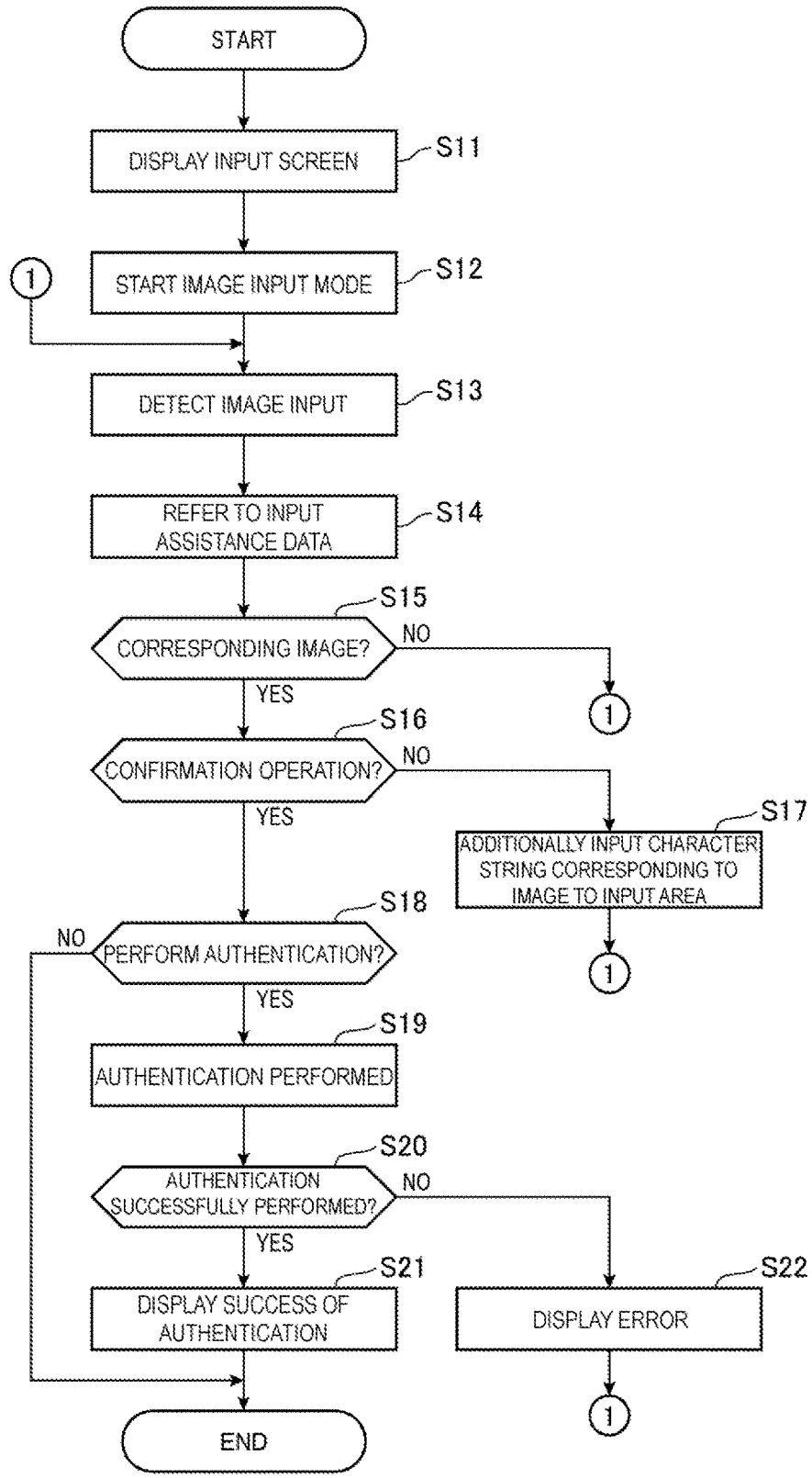
FIG. 6 is a flowchart illustrating operations of an HMD.
Figure 7:
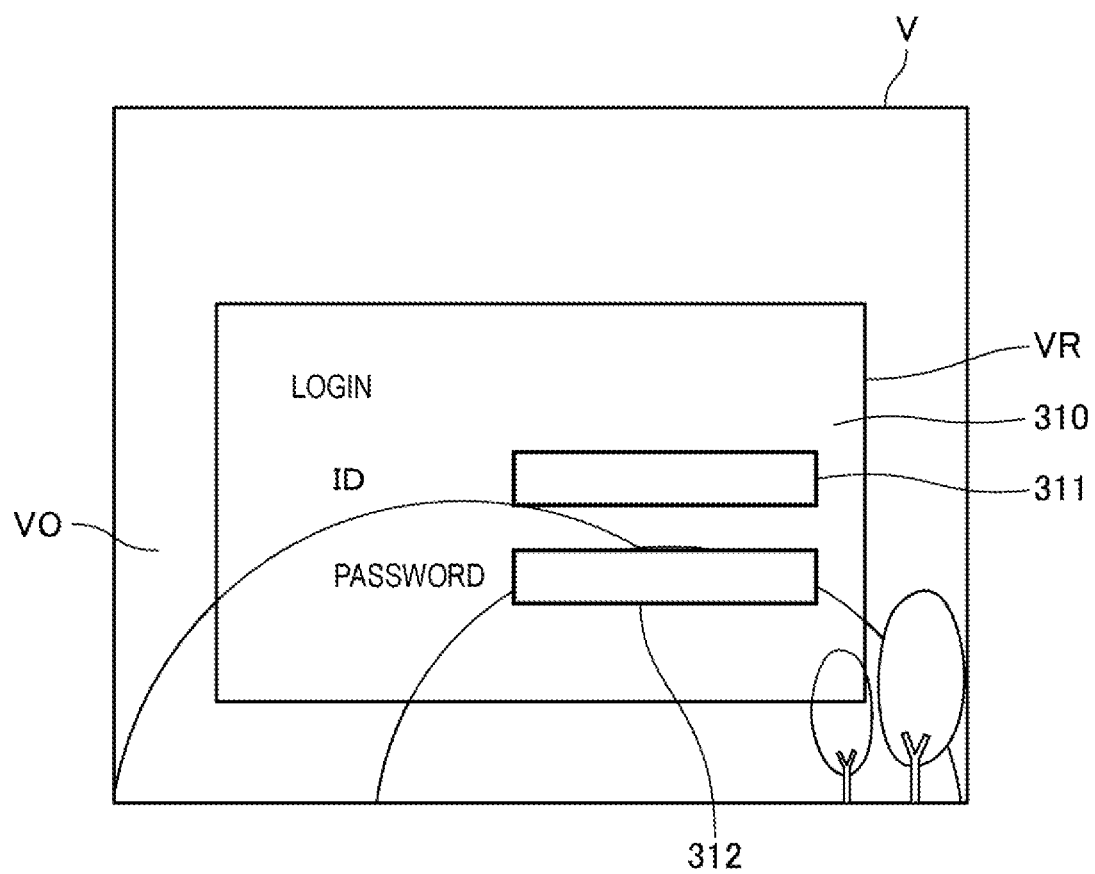
FIG. 7 is a diagram illustrating a configuration example of a screen displayed by an HMD.
Figure 8:
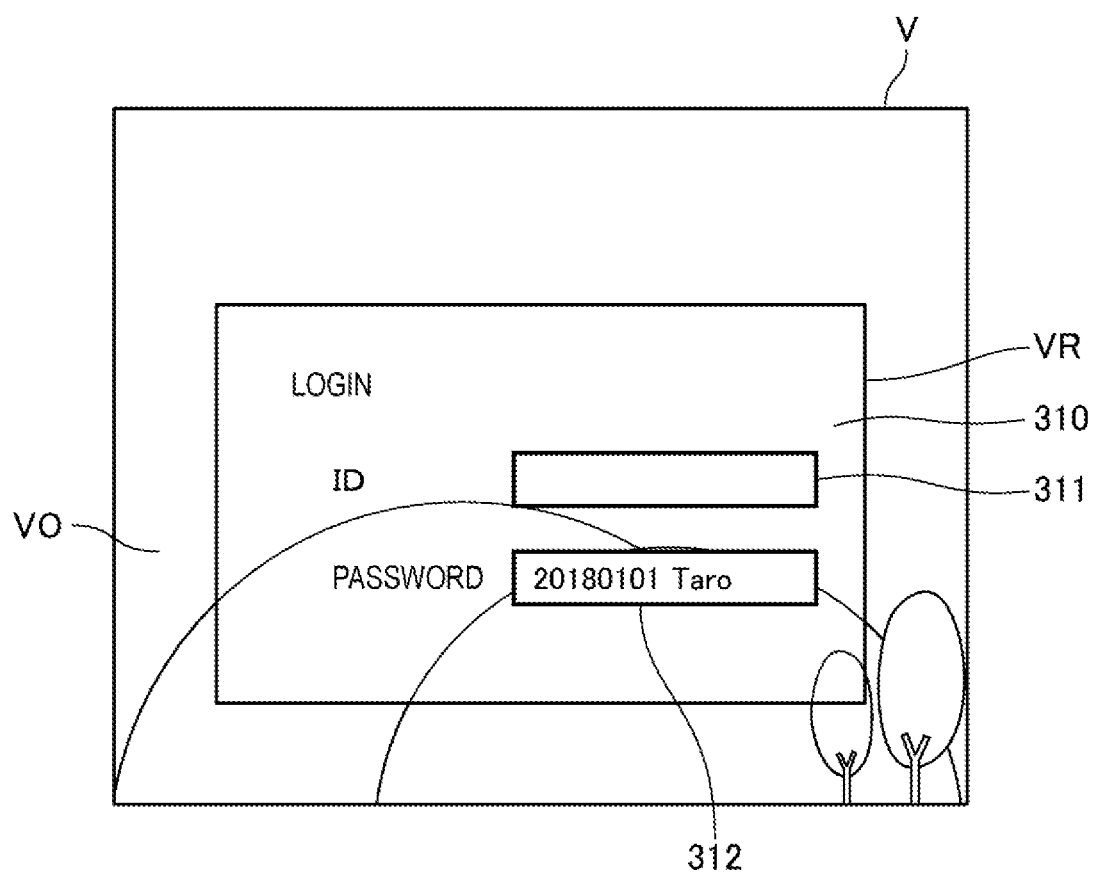
FIG. 8 is a diagram illustrating a configuration example of a screen displayed by an HMD.

FIG. 6 is a flowchart illustrating operations of the HMD 100. FIG. 7 and FIG. 8 are diagrams illustrating configuration examples of a screen displayed by the HMD 100, and correspond to an example of a user interface displayed by the operation illustrated in FIG. 6. First, the operations of the HMD 100 when performing the first authentication process will be described below based on these drawings.

In each drawing of FIG. 7 and FIG. 8, the field of view of the user U wearing the image display unit 20 is indicated by the symbol V, and the range in which the image displayed by the image display unit 20 is viewed in the field of view V is indicated by the symbol VR. Since the symbol VR indicates an area in which the image display unit 20 displays an image, the area is defined as a visualized region VR. In the field of view V, outside view can be viewed in a transmissive manner with external light transmitting through the image display unit 20. The outside view seen in the field of view V is indicated by VO.

The controller 150 causes the function of the display controller 158 to display an input screen having an input area for character input (Step S11), and to start the input mode for receiving an image input (Step S12).

An input screen 310 illustrated in FIG. 7 is an example of a user interface to be displayed in Step S11. The input screen 310 is, for example, a web page in which a web site is logged in, where input areas 311 and 312 in which a character string is entered, are arranged.

Turning back to FIG. 6, the controller 150 causes the function of the imaging controller 153 to acquire a captured image of the camera 61, and causes the function of the image detection unit 155 to analyze the captured image data and to then detect an image input by the user U (Step S13).

The controller 150 causes the character string processing unit 159 to refer to the input assistance data 145 (Step S14), and determines whether the image having been input in Step S13 corresponds to an input image of the input assistance data 145 (Step S15).

When the image having been input in Step S13 does not correspond to an input image of the input assistance data 145 (Step S15; NO), the controller 150 returns to Step S13. Herein, the controller 150 may display an error message to then return to Step S13. For example, the HMD 100 may be configured to be settable beforehand whether to display an error message. The setting status regarding displaying the error message may be included in the setting data 143, for example.

When the image having been input corresponds to an input image of the input assistance data 145 (Step S15; YES), the controller 150 determines whether the input character string set in the input assistance data 145 in association with the input image (Step S16) is the key code of the confirmation operation. When the image having been input is not the key code of the confirmation operation (Step S16; NO), the controller 150 causes the function of the character string processing unit 159 to retrieve an input character string set in the input assistance data 145 in association with the input image and to then input the retrieved input character string to the input area (Step S17), and then returns to Step S13.

The controller 150 is configured to be capable of repeating Steps S13 to S17. Accordingly, as described above, in a case when image input in Step S13 is performed a plurality of times, a character string corresponding to each of the input images may be input to the input area in accordance with the input order of the images. For example, the image No. 3 and the image No. 1 are caused to input in this order in the example of the input assistance data 145 illustrated in FIG. 5, the character string "20180101" and the character string "Taro" are caused to be input in a combined manner to the input region 312, as illustrated in FIG. 8. In Steps S13 to S17, a character input may be performed in the "password" column illustrated in FIG. 8 as well as in the "ID" column, for example. In this case, a configuration may be employed in which a cursor is displayed in the input target column, and the character string is caused to be input to where the cursor is located, where the cursor may be moved from the ID input column to the password input column by causing the key code to be input.

When the input character string set in the input assistance data 145 in association with the input image is the key code of the confirmation operation (Step S16; YES), the controller 150 causes the function of the character string processing unit 159 to confirm the character string having already been input to the input area. Herein, in a case when the input character string set in the input assistance data 145 in association with the input image includes the key code of the confirmation operation, the input character string is retrieved as well as the input character string is confirmed. The controller 150 determines whether to perform the authentication process (Step S18). The case where the authentication process is not performed may be, for example, a case where the input mode having started in Step S12 does not serve as a mode for performing authentication process. Specifically, a case may be exemplified where the HMD 100 receives a message from another device to display the message and starts the image input mode in Step S12 to cause a response message directed to this message to be input. In this case, the controller 150 causes, in response to the image input performed in Step S13, a character string of the response message to be input and then confirms the character string in Step S15. Thereafter, the controller 150 determines that an authentication process is not to be performed (Step S18; NO), the controller 150 performs a preset processing such as sending of a response message, and then terminates the current process.

In accordance with a determination that an authentication process is to be performed (Step S18; YES), the controller 150 causes the authentication processing unit 160 to perform the authentication process (Step S19). In Step S19, the authentication processing unit 160 compares the character string having been input in Step S18 with the authentication data 149 to perform an authentication process.

The controller 150 determines whether the authentication process has been successfully performed (Step S20), where when the authentication has been successfully performed (Step S20; YES), the controller 150 causes a message indicating the success of the authentication to be displayed (Step S21), and then terminates the current process. While when the authentication has failed (Step S20; NO), the controller 150 causes an error message indicating the failure of the authentication to be displayed (Step S22), and then returns to Step S13.

Figure 9:
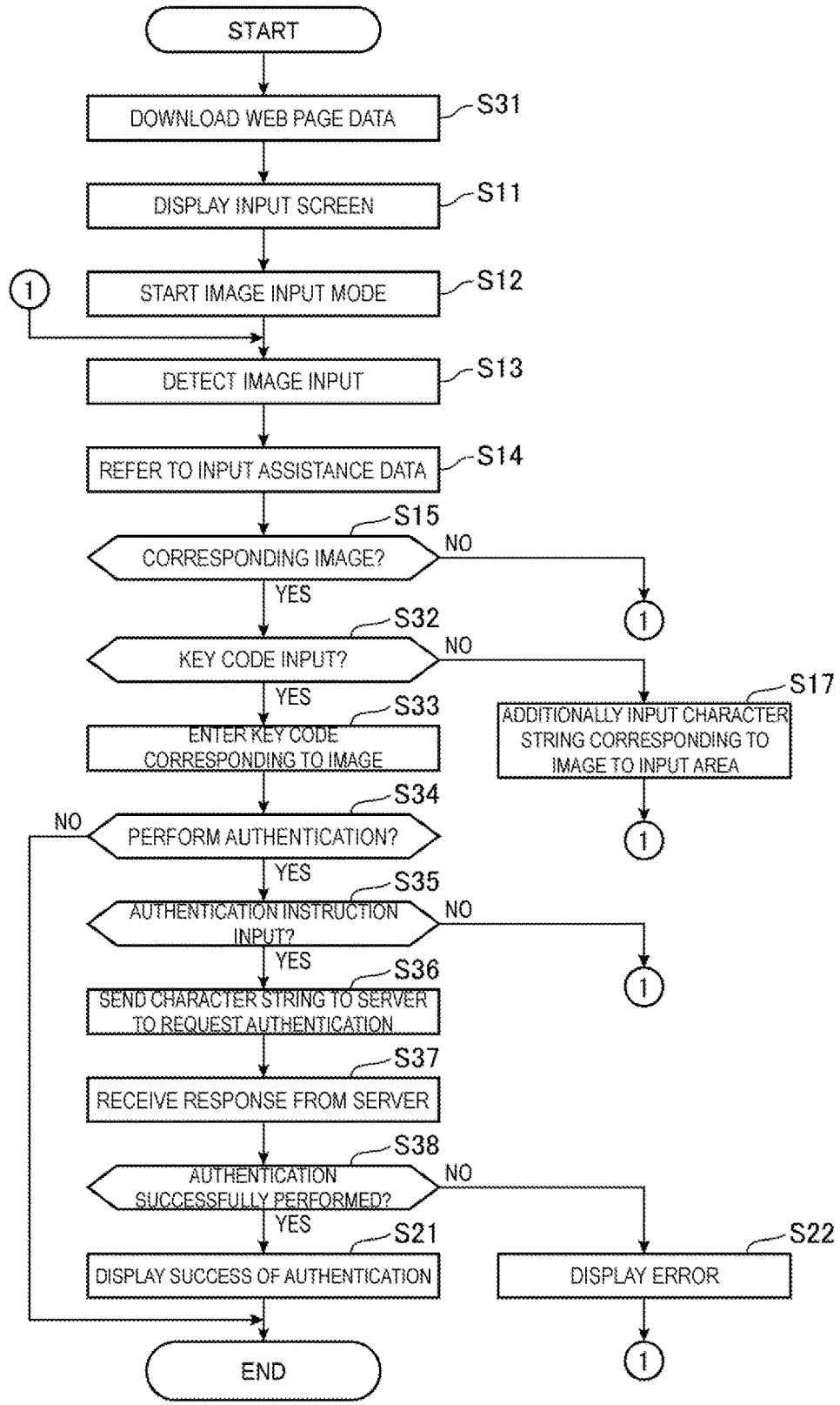
FIG. 9 is a flowchart illustrating operations of an HMD.
Figure 10:
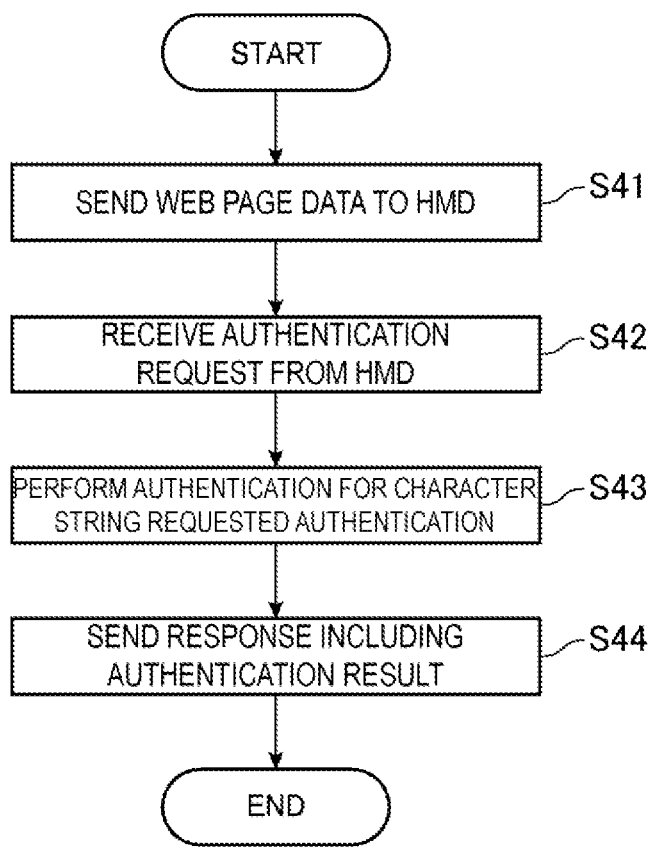
FIG. 10 is a flowchart illustrating operations of a server.

FIG. 9 is a flowchart illustrating operations of the HMD 100, and FIG. 10 is a flowchart illustrating operations of the server 400. Based on these drawings, the operations of the authentication system 1 when performing the second authentication process will be described.

The server 400 causes the function of the communication controller 403 to send the data of the web page constituting the user interface to the HMD 100 (Step S41).

The HMD 100 causes the function of the communication controller 152 to download the data of the web page from the server 400 (Step S31). Based on the data of the downloaded web page, the HMD 100 causes the function of the display controller 158 to display an input screen having the input area for character input (Step S11) and to start an input mode for receiving an image input (Step S12).

The operations performed in Steps S11 to S15 are common with the above-described first authentication process (FIG. 6).

When the image having been input in Step S15 corresponds to an input image of the input assistance data 145 (Step S15; YES), the controller 150 determines whether the input character string set in the input assistance data 145 in association with the input image is the key code (Step S32). When the input character string is not the key code (Step S32; NO), the controller 150 causes the function of the character string processing unit 159 to retrieve the input character string set in the input assistance data 145 in association with the input image and to then input the input character string to the input area (Step S17), and then returns to Step S13.

While when the input character string set in the input assistance data 145 in association with the input image is the key code (Step S32; YES), the controller 150 causes the key code corresponding to the input image to be input (Step S33). For example, when the "tab" key code is input, the controller 150 performs a function of causing the position of the cursor to be moved in the user interface to a different input column, or causing a button (not illustrated) arranged in the user interface to be selected, for example. In addition, when the input character string set in the input assistance data 145 in association with the input image includes the key code of the confirmation operation, the input character string is retrieved as well as the input character string is confirmed.

The controller 150 determines whether to perform the authentication process (Step S34). This determination is the same as in Step S18. In accordance with a determination that the authentication process is not to be performed (Step S34; NO), the controller 150 performs a preset processing such as sending of a response message, and then terminates the current process.

In accordance with a determination that the authentication process is to be performed (Step S34; YES), the controller 150 determines whether the key code having been input in Step S33 is an input for instructing performing the authentication (Step S35). When the key code is not an input for instructing performing the authentication (Step S35; NO), the controller 150 returns to Step S13. While when the key code is not an input for instructing performing the authentication (Step S35; YES), the controller 150 causes the function of the character string processing unit 159 to confirm the character string having already been input to the input area. The controller 150 causes the authentication processing unit 160 to send the confirmed input character string together with an authentication request to the server 400 (Step S36).

The server 400 receives the authentication request that is sent from the HMD 100 (Step S42), and causes the authentication processing unit 404 to perform authentication on the character string having been received together with the authentication request (Step S43). The server 400 generates a response including the authentication result, and causes the communication controller 403 to send the response to the HMD 100 (Step S44).

The HMD 100 causes the function of the communication controller 152 to receive a response from the server 400 (Step S37), and determines whether the authentication result included in the response indicates that the authentication has been successfully performed (Step S38).

When the authentication has been successfully performed (Step S38; YES), the HMD 100 performs a display indicating that the authentication has been successfully performed (Step S21), and then terminates the current process. While when the authentication has been failed (Step S38; NO), the HMD 100 causes an error message indicating the failure of the authentication to be displayed (Step S22), and then the HMD 100 returns to Step S13.

As described above, the HMD 100 includes the image display unit 20 to be mounted on the head of the user U and configured to transmit the outside view VO through the image display unit 20 to be visually recognizable. The HMD 100 includes the camera 61 configured to capture an image of a range including an outside view transmitted through the image display unit 20 to be visually recognizable, and the storage unit 140 configured to store information about an image of a object and character information in association with the image of the object. The HMD 100 includes the image detection unit 155 configured to detect an input image which is the image of the object from a captured image of the camera 61. The HMD 100 also includes the character string processing unit 159 configured to retrieve character information in association with the image of the object detected by the image detection unit 155 from the storage unit 140, and to arrange a character or character string represented by the retrieved character information in detection order of the object to generate a character string. The controller 150 is configured to cause the image display unit 20 to display a user interface for character input and to cause the character string generated by the character string processing unit 159 to be input to the input area arranged in the user interface.

According to the HMD 100 to which the head-mounted display apparatus and the method for controlling the head-mounted display apparatus according to the invention is applied, a character string can be input with a simple operation of entering an image, alleviating the burden of input operations of entering a character string in the user interface. In a case of using an authentication image as in the configuration of JP-A-2008-217716, the authentication image cannot be reused to maintain the confidentiality of the authentication key, and thus the authentication image needs to be prepared in accordance with the number of authentication keys. On the contrary, the HMD 100 is configured to detect the image of the object and to cause a character string based on the character information in association with the image of the object to be generated and to be input, enabling a character string to be entered by an operation of causing an image to be detected. This makes it possible to cause a character string to be entered with a simple operation irrespective of the complexity of the character string without impairing the confidentiality of the character string, and to thus alleviate the burden of input operations of entering a character string. Character string are successively entered in accordance with the input order of images, enabling images to be combined, to thus make it possible to handle inputs of various types of character strings using a limited number of images.

The authentication system 1 also includes the HMD 100, and the server 400 as an authentication device, and is configured to perform the second authentication process. The HMD 100 includes the communication unit 117 configured to perform communication, the image display unit 20 to be mounted on the head of the user U and configured to transmit an outside view through the image display unit 20 to be visually recognizable, and the camera 61 configured to capture an image of a range including an outside view transmitted through the image display unit 20 to be visually recognizable. The HMD 100 also includes the storage unit 140 configured to store information about an image of a object and character information in association with the image of the object, and the image detection unit 155 configured to detect an image of a object from a captured image of the camera 61. The HMD 100 also includes the character string processing unit 159 configured to retrieve character information in association with the image of the object detected by the image detection unit 155 from the storage unit 140, and to arrange a character or character string represented by the character information having been retrieved in detection order of the object to generate a character string. The controller 150 of the HMD 100 is configured to cause the image display unit 20 to display a user interface for character input and to cause the character string generated by the character string processing unit 159 to be input to the input area arranged in the user interface. The controller 150 also includes the communication controller 152 configured to cause the communication unit 117 to send the input character string together with the authentication request and to cause the communication unit 117 to receive the authentication result. The server 400 includes the server communication unit 420 and the storage unit 410 configured to store the authentication data 413 including a preset character string for authentication. The server 400 includes the authentication processing unit 404 configured to compare a character string received by the server communication unit 420 with the authentication data 413 stored in the storage unit 410 to perform authentication, and to cause the server communication unit 420 to send an authentication result to a sender having sent the character string. The authentication system 1 allows, in a configuration in which the character string for authentication having been entered in the HMD 100 is authenticated by the server 400, a character string to be entered in the HMD 100 with a simple operation and without impairing the confidentiality of the character string. This alleviates the burden of input operations of entering a character string.

The HMD 100 also includes the authentication processing unit 160 configured to authenticate an input character string as a target in the first authentication process. The storage unit 140 is configured to store the preset authentication data 149 as a character string for authentication. The authentication processing unit 160 is configured to compare an input character string with the authentication data 149 stored in the storage unit 140 to perform authentication. This alleviates the burden of input operations of entering a character string for authentication.

The HMD 100 also includes the communication unit 117, the communication controller 152 configured to cause, in the second authentication process, the communication unit 117 to send an input character string together with an authentication request, and to cause the communication unit 117 to receive an authentication result. This alleviates, in a case when the authentication is performed using an external device, the burden of operations of entering a character string for authentication.

The input image set in the input assistance data 145 may also be an image of a hand of the user U, which is constituted by a combination of images of a plurality of hands having different shapes. In this case, the controller 150 generates, in response to a detection of images of a plurality of hands having different shapes by the image detection unit 155, a character string corresponding to the combination of the images of hands having been detected. This allows the HMD 100 to cause a character string to be readily entered through a gesture by the hand of the user U.

The input image set in the input assistance data 145 may also be an image of a hand of the user U, where the hand is caused to have a predefined shape. In this case, the controller 150 generates, in response to a detection of an image of a hand having a predefined shape by the image detection unit 155, a character string corresponding to the image of the hand having been detected. This allows a character string to be readily entered through an entry by way of the shape of a hand.

The invention is not necessarily limited to the above exemplary embodiments, and is carried out in various modes without departing from the gist of the invention.

In the above exemplary embodiment, an example is described in which a character string is caused to be input to the input screen 310 as a user interface on the condition that the image detected from the captured image data of the camera 61 by the image detection unit 155 corresponds to the input image set in the input assistance data 145. The controller 150 may be configured to perform, for example, an operation set in the input assistance data 145 without causing a character string to be entered. Specifically, the input assistance data 145 may be caused to store information indicating processing to be performed by the controller 150, or commands for causing the controller 150 to perform processing, in association with the input image. The commands include, for example, data designating processing to be performed by the controller 150 and control data instructing performance of processing. In this case, a performance of processing is instructed to the controller 150 on the condition that the image detected by the image detection unit 155 corresponds to the input image set in the input assistance data 145. The above process may also be, for example, an authentication process. The above process may also be performed after an authentication is performed determining that the authentication has been successfully performed. According to the above configuration, causing the camera 61 to input an image itself can be the authentication process, abbreviating the input of the character string to enable the input of the image to be used as an authentication and further alleviating the burden of operations required for an authentication process.

The input image set in the input assistance data 145 may also be an image of a physical body or building. In this case, the user U may cause the camera 61 to capture an image of a physical body and building to cause an input of a character string and an authentication to be performed. Accordingly, in a case where the user U is working with both hands wearing the image display unit 20, directing the camera 61 in the direction of a predefined physical body or building allows the user U to perform an input of a character string and an authentication without performing an input using a hand.

The character string processing unit 159 may be configured to be capable of causing other information to be input when performing an input of a character string in association with an input image in the input assistance data 145.

The other information may be, for example, texts generated by a voice recognition process performed by the voice analysis unit 154. The other information may also be, for example, a name of a person identified by a face authentication, where the face authentication of the person is performed by the image detection unit 155 based on the captured image data of the camera 61. The other information may also be, for example, position information of the HMD 100 detected by the GPS 115 controlled by the controller 150. The other information may also be, for example, the information about the orientation and altitude of the HMD 100 detected by the six-axis sensor 111 or the magnetic sensor 113 controlled by the controller 150. The other information may also be, for example, time information detected by the controller 150. The other information may also be, for example, information acquired through a communication of the controller 150 with an external device, using the communication controller 152. Such type of information includes information about fingerprints obtained from a device equipped with a fingerprint sensor, temperature information obtained from a device equipped with a temperature sensor, and humidity or atmospheric pressure obtained from a device equipped with a dry/wet sensor or an atmospheric pressure sensor. In addition, for example, the image detection unit 155 may detect a preset marker or an imaged code based on the captured image data of the camera 61, and information in association with the detected marker or code may be caused to be input. These configurations allow information about the status of the HMD 100 to be sent to the server 400 or the like in addition to preset character strings in the input assistance data 145. In this case, the server 400 may be configured to perform authentication on a character string caused to be input based on the input assistance data 145, and the server 400 may be configured to retrieve the auxiliary information added to the input image based on the input assistance data 145 in a case when the authentication has been successfully performed.

For example, instead of the image display unit 20, an image display unit of another type such as an image display unit wearable like a cap may be employed, where the image display unit is required to include a display unit configured to display an image corresponding to the left eye of the user U and a display unit configured to display an image corresponding to the right eye of the user U. The display apparatus of the invention may be configured as a head-mounted display to be installed in vehicles such as an automobile and an aircraft. For example, the display apparatus may be configured as a head-mounted display built into a body protector tool such as a helmet. In this case, the head-mounted display may be mounted at a portion determining the position of the portion relative to the body of the user U, and at a portion the position of which is determined relative to the portion.

A configuration may also be employed in which the controller 10 and the image display unit 20 are integrally configured with each other, and are to be mounted on the head of the user U. As the controller 10, a notebook computer, a tablet computer, a desktop computer, portable electronic devices including a game machine, a mobile phone, a smart phone, or a portable media player, and other dedicated devices may be used.

In the above-described embodiment, a description has been made of an exemplary configuration in which the controller 10 and the image display unit 20 are separated from each other and are coupled to each other via the coupling cable 40. The controller 10 and the image display unit 20 may also be coupled to each other via a wireless communication line.

As an optical system guiding imaging light to the eyes of the user U, a system may be employed in which the right light-guiding plate 26 and the left light-guiding plate 28 are configured using a half mirror, a diffraction grating, a prism, or the like. The image display unit 20 may be configured using a holographic display unit.

At least some of the respective functional blocks illustrated in the block diagrams may be configured to be implemented by hardware, or may be configured be implemented through cooperation between hardware and software, without being limited to the configuration in which separate hardware resources are disposed as illustrated in the drawings. A program to be executed by the controller 150 may be stored in the non-volatile storage unit 121 or other storage devices (not illustrated) in the controller 10. Alternatively, a configuration may be employed in which a program stored in an external device is acquired via the USB connector 19, the communication unit 117, the external memory interface 191, or the like to be executed. The constituent elements provided in the controller 10 may also be provided in the image display unit 20. For example, a processor having an equivalent configuration as the main processor 125 may be disposed in the image display unit 20, and a configuration may be employed in which the main processor 125 of the controller 10 and the processor of the image display unit 20 may each perform individual functions.

In a case where the method for controlling the head-mounted display apparatus of the invention is implemented using a computer, the invention may be configured in the mode of a program causing the computer to implement the control method described above, or a recording medium on which the program is recorded in a computer readable format, or a carrier medium for sending the program. The recording medium described above may be a magnetic recording medium, an optical recording medium, or a semiconductor memory device. Specifically, a portable or stationary type recording medium, such as a flexible disk, a Hard disk Drive (HDD), a Compact Disk Read Only Memory (CD-ROM), a Digital Versatile Disk (DVD), a Blu-ray (trade name) disc, a magneto-optical disc, a flash memory, a card type recording medium, or the like may be exemplified. The recording medium described above may be non-volatile storage devices such as a RAM, a ROM, and an HDD, all representing internal storages included in an image display apparatus.

The entire disclosure of Japanese Patent Application No. 2018-030858, filed Feb. 23, 2018 is expressly incorporated by reference herein.

What is claimed is:

1. A head-mounted display apparatus comprising:
   a display that is mounted on a head of a user and that displays a user interface to overlap an outside view;
   a camera that captures a captured image including a range of the outside view in which the user interface overlaps;
   a processor that detects a first object and a second object from the captured image; and
   a memory that stores a first character information in association with the first object and a second character information in association with the second object, wherein:
      when the processor detects the first object after detecting the second object, the display displays a first character string that includes the first character information combined at an end of the second character information, in the user interface, and
      when the processor detects the second object after detecting the first object, the display displays a second character string that includes the second character information combined at an end of the first character information, in the user interface.

2. The head-mounted display apparatus according to claim 1, wherein:
   the memory stores a preset character information for authentication, and
   the processor authenticates the first character string or the second character string by comparing the first character string or the second character string to the preset character information.

3. The head-mounted display apparatus according to claim 1, comprising:
   a communication unit having a circuit, the communication unit communicating with an authentication device, wherein
   the communication unit sends the first character string or the second character string with an authentication request to the authentication device and receives an authentication result to the authentication request.

4. The head-mounted display apparatus according to claim 1, wherein:
   the first object is a first shape of a hand of the user, and the second object is a second shape of the hand of the user different from the first shape.

5. An authentication system that includes an authentication device and a head-mounted display communicating with the authentication device, the authentication system comprising:
   a display that is mounted on a head of a user and that displays a user interface to overlap an outside view;
   a camera that captures a captured image including a range of the outside view in which the user interface overlaps;
   a processor that detects a first object and a second object from the captured image;
   a memory that stores a first character information in association with the first object and a second character information in association with the second object, wherein:
      when the processor detects the first object after detecting the second object, the display displays a first character string that includes the first character information combined at an end of the second character information, in the user interface, and
      when the processor detects the second object after detecting the first object, the display displays a second character string that includes the second character information combined at an end of the first character information, in the user interface.

6. A method for controlling a head-mounted display apparatus that includes a display displaying a user interface to overlap an outside view, the method comprising:
   capturing a captured image including a range including of the outside view in which the user interface overlaps;
   detecting a first object and a second object from the captured image; and
   storing a first character information in association with the first object and a second character information in association with the second object, wherein:
      when the detecting detects the first object after detecting the second object, the method includes causing the display to display a first character string that includes the first character information combined at an end of the second character information, in the user interface, and
      when the detecting detects the second object after detecting the first object, the method includes causing the display to display a second character string that includes the second character information combined at an end of the first character information, in the user interface.

* * * * *